R.F. POWELL
E.F. MARTIN
J. LURIE
R.J. NICHOL
E.M. BRAND
Inventors

By Wenderoth, Lind & Ponack
Attorneys

R.F. POWELL
E.F. MARTIN
J. LURIE
R.J. NICHOL
E.M. BRAND
Inventors

By Wenderoth, Lind
& Ponack
Attorneys

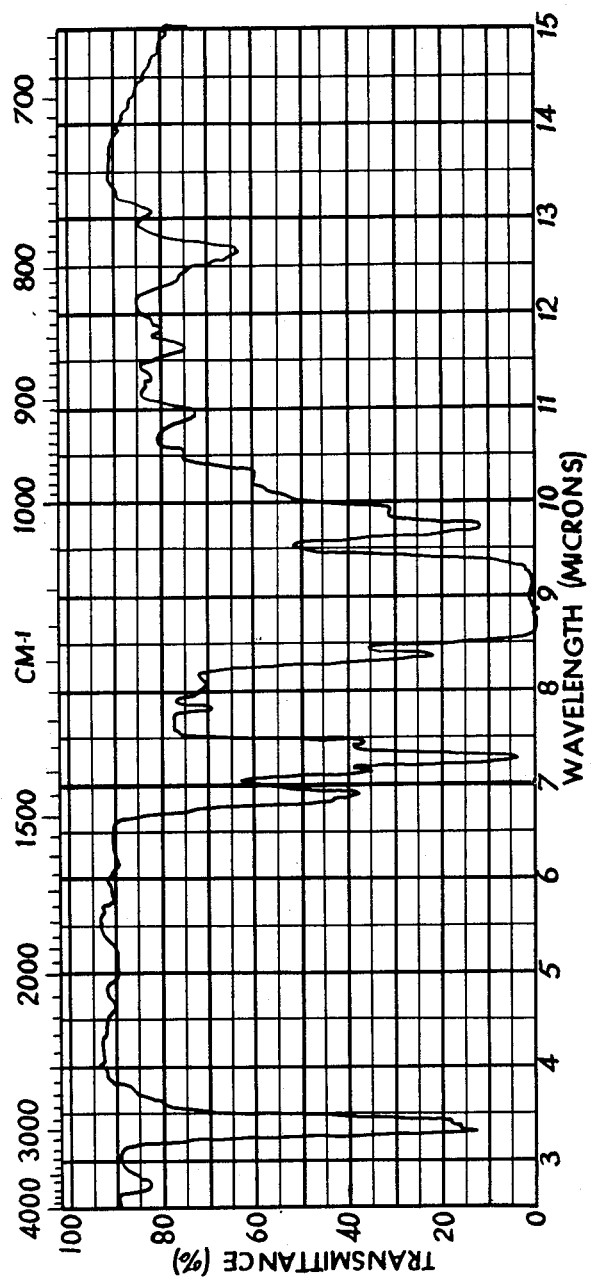

1,3,5-TRIALKOXYALKYLTRIOXANES AND PROCESS FOR THEIR PRODUCTION

Roger Frederick Powell, Johannesburg, Eric Francis Martin, Germiston, Julian Lurie and Robert James Nichol, Johannesburg, and Ernst Marais Brand, Pretoria, all of Transvaal Province, Union of South Africa, assignors to National Chemical Products Limited, Germiston, Transvaal Province, Union of South Africa, a company of Union of South Africa
Original application Apr. 29, 1959, Ser. No. 809,814. Divided and this application June 21, 1961, Ser. No. 124,269
Claims priority, application Union of South Africa May 9, 1958
17 Claims. (Cl. 260—340)

This application is a division of Serial No. 809,814, filed on April 29, 1959.

This invention relates to new chemical compounds, and processes for the preparation thereof.

The new chemical compounds of this invention have the general formula:

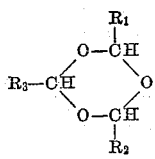

wherein $R_1$, $R_2$ and $R_3$ are alkoxy-substituted straight chain alkyl radicals in which the straight chain portion has 1 to 3 carbon atoms and the alkoxy substituent also has 1 to 3 carbon atoms.

According to this invention there is also provided a process for the production of these new chemical compounds comprising polymerising, in the presence of catalytic quantities of a halogen, one or more substituted aldehydes having 2 to 4 carbon atoms and each containing as a substituent an alkoxy group having 1 to 3 carbon atoms. Depending on whether or not the starting material is a single substance or a mixture of these substances $R_1$, and $R_2$ and $R_3$, in the general formula above, may be the same or different. Iodine is the preferred catalyst.

The novel substances of this invention are shown by examples given in detail hereafter to have valuable properties in the art of flotation, when used additionally to known promotors such as xanthates, with or without known frothers being also present; as the more detailed examples show, their net effect is to "accelerate" the flotation in a concentrate of the particular mineral being floated by the known promotors and frothers. As is well-known in the art of flotation the effect of a particular reagent differs from ore to ore and it is therefore well-known to test by standardised well-known procedures the effect both in degree and kind of a particular reagent on a particular ore.

The new chemical compounds of this invention may with some ores show a dominance of their collecting properties and with other ores a dominance of their frothing properties and the degree of effectiveness of the said properties will also depend on the particular ore being used. Furthermore the new compounds of this invention can either be used in their purified form or can be used directly as the reaction product of the reactions set out hereunder by way of example, without purification.

Purely by way of example and without in any way limiting the generality of the aforegoing some examples will now be given for the purpose of illustrating this invention.

EXAMPLE I.—PRODUCTION of 2.4.6-TRIS-(2' METHOXY-PROPYL)-1.3.5-TRIOXANE 200 mls. of beta-methoxy-butraldehyde having a water content of less than 0.1% and preferably less than 0.05% is treated with 0.1 gm. of iodine. Heat is liberated and the temperature rises from about room temperature to about 50° C. in approximately 10 minutes. However, it has been noticed that the reaction may continue slowly after this stage.

At the completion of the vigorous reaction or, if desired, some time thereafter, the reaction product is purified by distillation in known manner to yield the above-mentioned new chemical substance which has a boiling point of 100° C. at 0.05 mm. mercury. The structural formula of this substance is:

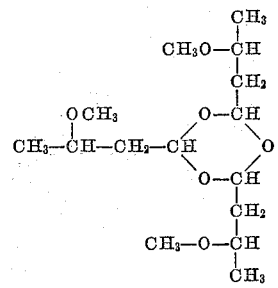

This substance has an infra-red absorption spectrum which is characteristic thereof, as set out in FIGURE 1 of the drawings annexed hereto. Other identifying properties of this substance are given in Table I below.

EXAMPLE II

Other members of the class of new chemical compounds according to this invention can be prepared in a manner similar to Example I. Further examples are therefore given below of the production of other representative members of this class. These examples are arranged in the order of the starting materials, i.e. the substituted aldehydes. giving first the processes and thereafter giving the identifying properties of the compounds produced.

A. Processes (i) *Acetaldehydes.*—Methoxyacetaldehyde and ethoxy-acetaldehyde were prepared in known manner and dried in known manner. To each of these substances a catalytic quantity of iodine was added in accordance with the process set out in Example I. An immediate increase in temperature indicated in each case the formation of the polymer. In each case the product was purified by distillation under reduced pressure in known manner and the identifying properties, as set out below, were determined.

(ii) *Propionaldehyde.*—Beta-methoxypropionaldehyde was prepared and dried in known manner and then subjected to polymerisation according to the process of this invention in the presence of catalytic quantities of iodine. Thereafter the product was purified by distillation under reduced pressure in known manner and the identifying properties set out below, determined.

(iii) *Butyraldehyde.*—Beta-ethoxybutyraldehyde and beta-n-propoxy-butyr-aldehyde were all prepared and dried in known manner and then each was subjected to the polymerisation process of this invention in the presence of catalytic quantities of iodine. Thereafter the products were purified by distillation under reduced pressure in known manner and the identifying properties set out below, determined.

(iv) *A mixture of beta-methoxybutyraldehyde and beta-ethoxybutyraldehyde.*—80 ml. of beta-methoxy-butyraldehyde (crude) and 40 ml. of ethoxy-butyraldehyde (crude) were mixed and a catalytic quantity of iodine added. The mixture was allowed to stand overnight and subsequently fractionated under reduced pressure. The major fraction had a boiling point of 104° C. at 0.03 mm. mercury and a molecular weight of 320. This corresponds to the copolymer 2,4 bis-(2' methoxy-propyl)-6-(2' ethoxy-propyl)-1,3,5 trioxane which is represented by the following formula $$CH_3-CH-CH_2-CH \underset{O}{\overset{O}{\diagup\diagdown}} CH-CH_2-CH-CH_3$$

(with side group CH—CH₂—CH—OCH₃ with CH₃; OC₂H₅ and OCH₃ substituents)

B. Identifying Properties

The following table sets out the identifying properties of the various polymer products prepared as set out above. The molecular weights were determined with the "Gallenkamp Semi-micro Ebullio-meter." In this table furthermore the abbreviations R.I.=refractive index; S.G.=specific gravity and the other signs, symbols and abbreviations have their normal meaning to persons-in-the-art.

TABLE I

Polymeric Alkoxyaldehydes

| Polymer of :— | B. pt., °C. | Pressure, mm. Hg | Mol weight detd. | Mol weight theor. | R. I., 20° C. | S. G., 20/20°C. |
|---|---|---|---|---|---|---|
| Methoxyacetaldehyde | 100 | 1.0 | -------- | 222 | 1.4438 | 1.1424 |
| Ethoxyacetaldehyde | 91–92 | 0.1–0.2 | 261 | 264 | 1.4371 | 1.0688 |
| Beta-methoxypropionaldehyde | 96 | 0.1 | 265 | 264 | 1.4390 | 1.0675 |
| Beta-methoxybutyraldehyde | 100 | 0.05 | 309 | 306 | 1.4342 | 1.0114 |
| Beta-ethoxybutyraldehyde | 120 | 0.05 | 349 | 348 | 1.4314 | 0.9702 |
| Beta-n-propoxybutyraldehyde | 129 | 0.05 | 404 | 390 | 1.4341 | 0.9535 |
| Beta-methoxy and beta-ethoxy-butyraldehyde | 104 | 0.03 | 320 | 320 | 1.4332 | 1.0064 |

As a further method of identification the infra-red spectra of a number of these compounds were obtained and are set out in the drawings annexed hereto in which:

FIG. 5 is the infra-red spectrum of the copolymer of beta-methoxybutyraldehyde and beta-ethoxybutyraldehyde referred to above.

EXAMPLE III

Figure 1:
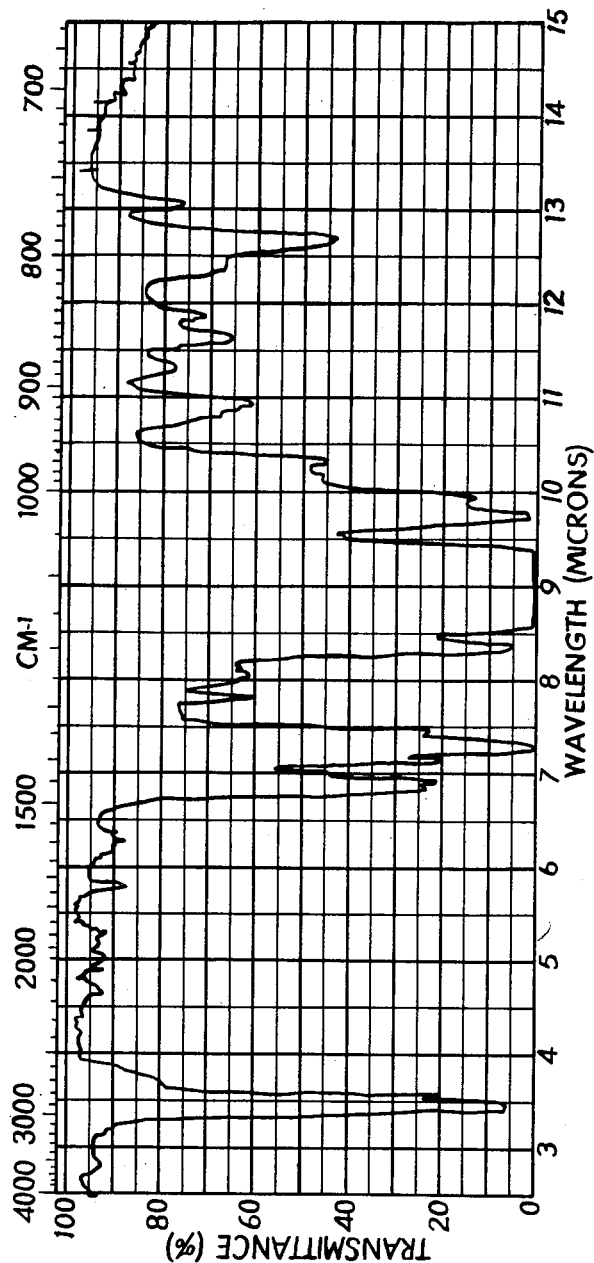
Figure 2:
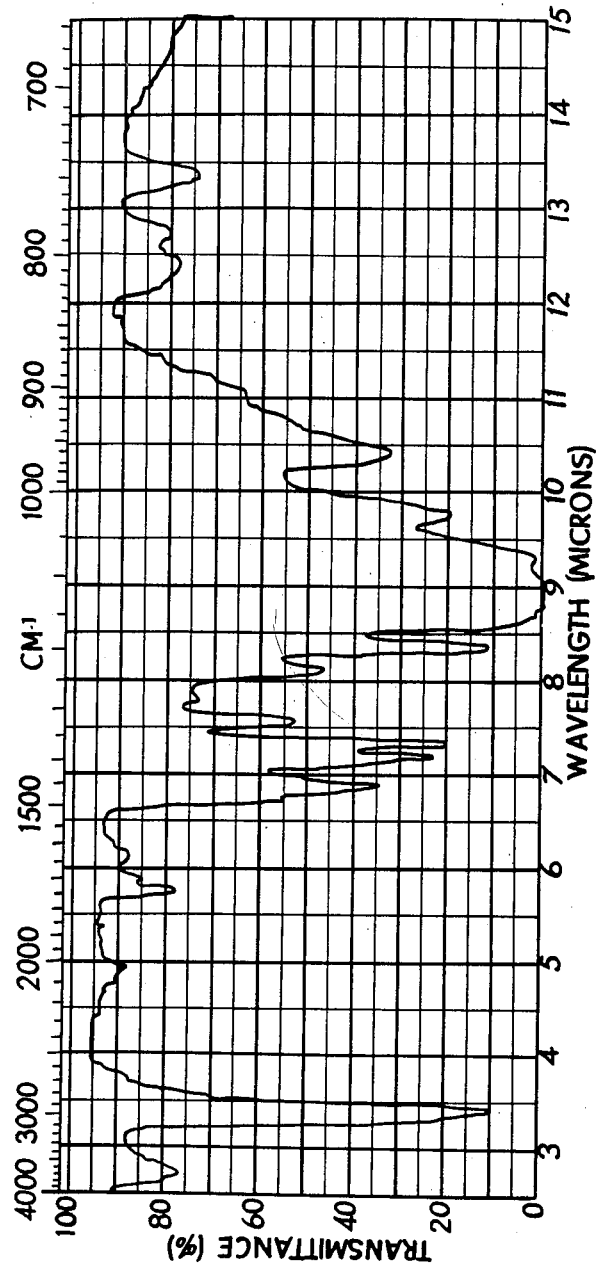
FIG. 2 is the infra-red spectrum of the beta-methoxypropionaldehyde polymer. The sample from which this spectrum was prepared was not quite pure, the impurities showing up in e.g. the absorption at about 2.75 and 5.75 microns.
Figure 3:
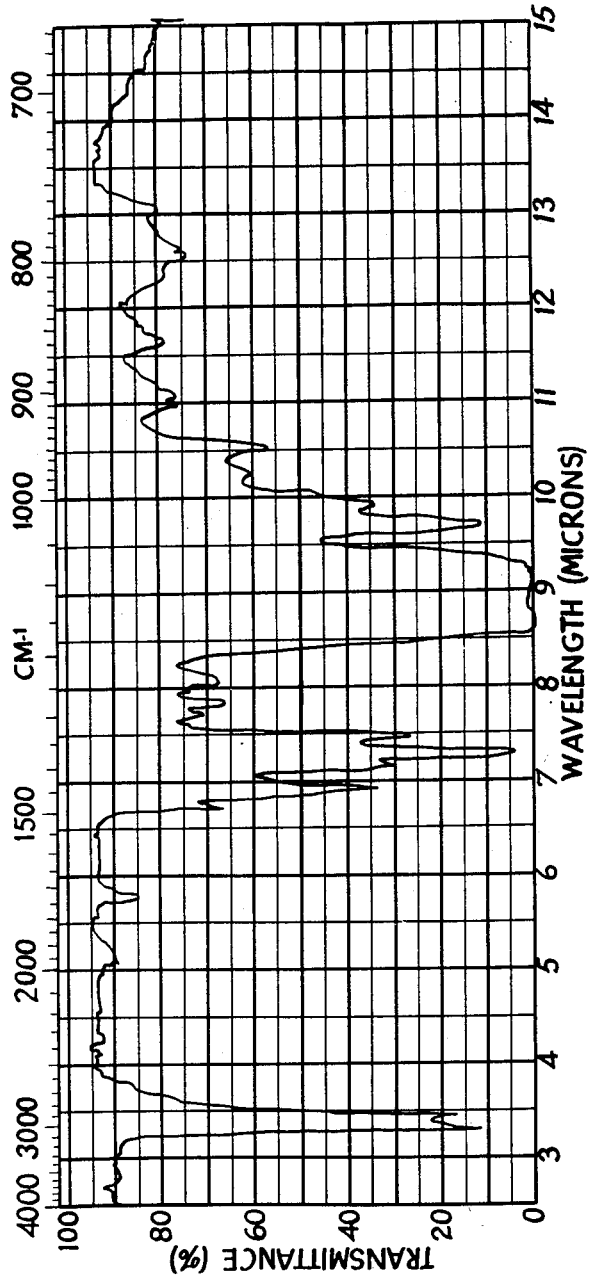
FIG. 3 is the infra-red spectrum of the beta-ethoxybutyraldehyde polymer.
Figure 4:
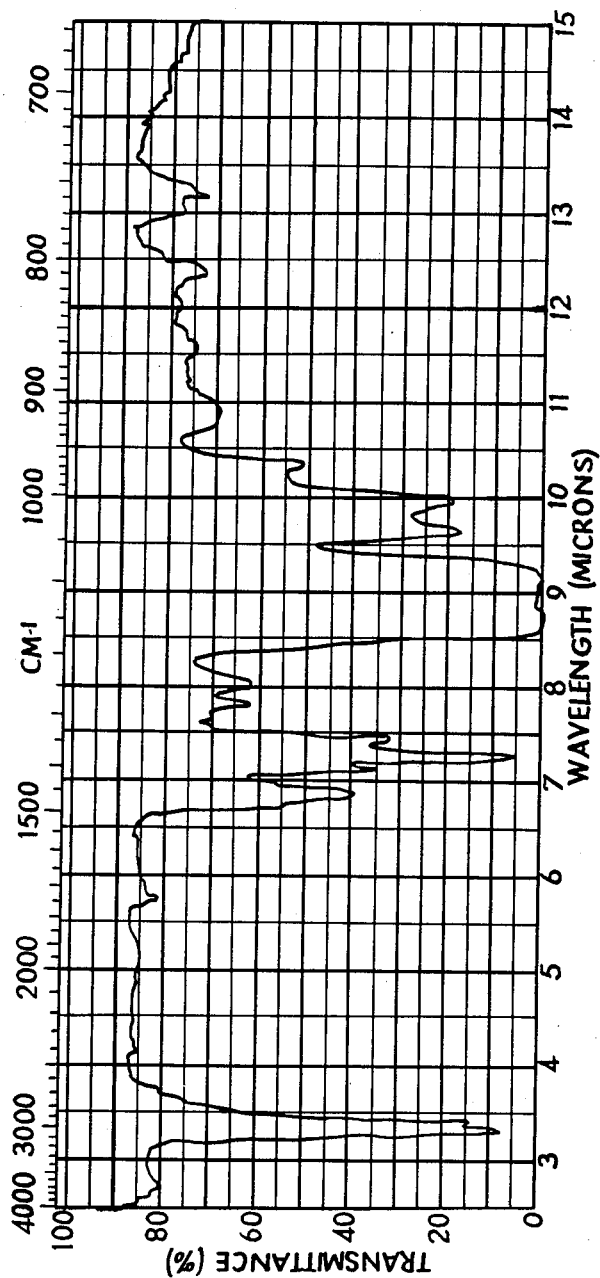
FIG. 4 is the infra-red spectrum of the beta-n-propoxybutyraldehyde polymer.

This example serves to illustrate the accelerating properties on froth flotation processes of the new chemical compounds of this invention. The same ore, a copper-zinc-pyrite ore, was subjected to a number of tests. In each test the standard procedure set out below was adopted. One test, hereinafter referred to as "control" was carried out without addition of any of the new compounds of this invention. In each of the other tests one of the new compounds was added. These tests were carried out with a number of representative members of the class of new chemical compounds according to this invention. The results of these tests are tabulated below.

*Standard Procedure in All Tests*

Crush ore to pass ⅛ inch screen.

Grind 3000 grams ore, 2200 ml. tapwater, 4 grams CaO, for 45 minutes; make up to volume in 10,000 ml. capacity Fahrenwald flotation machine.

pH of pulp is now 7.1.

Add 0.20 lb./ton of sodium-cyanide. Condition for 5 minutes.

Add 0.04 lb./ton of "Aerofloat 208." Condition 2 minutes.

Add 3 drops (0.018 lb./ton) of commercial T.E.B. (i.e. triethoxybutane) Frother.

Except to "Control," add 4 drops (0.024 lb./ton) of polymer being tested.

Float for 60 seconds. This is "Concentrate A."

Add 4.0 grams CaO. Condition for 5 minutes. pH of pulp is now 9.3 Add 0.04 lb./ton potassium-ethyl-xanthate. Condition 2 minutes.

Except to "Control," add 4 drops (0.024 lb./ton) of polymer being tested.

Float for 120 seconds. This is "Concentrate B."

Add 0.33 lb./ton of copper-sulphate. Condition for 5 minutes.

Add 2 drops (0.012 lb./ton) of commercial T.E.B. Frother.

Except to "Control," add 4 drops (0.024 lb./ton) of polymer being tested.

Float for 120 seconds. This is "Concentrate C."

Add 1.33 lb./ton of sulphuric acid. Condition for 5 minutes. pH of pulp is now 7.5.

Add 0.13 lb./ton of mixed xanthates (4 parts ethyl to 1 part amyl). Condition 2 minutes.

Add 2 drops (0.012 lb./ton) of commercial T.E.B. Frother.

Except to "Control," add 4 drops (0.024 lb./ton) of polymer being tested.

Float for 180 seconds. This is "Concentrate D."

Remaining pulp is discharged and filtered as Tailings.

The detailed results of the control test are set out in Table II showing the method of arriving at the "percentage recoveries" shown in Table IV. In Table III is set out the key to the nomenclature used in this example with respect to the illustrative members of the new class of chemical compounds according to this invention which were used in these tests.

TABLE II

| Product | Percent weight | Copper | | | Zinc | | | Sulphur | | |
|---|---|---|---|---|---|---|---|---|---|---|
| | | Assay percent Cu | Percent weight × assay units Cu | Percent recovery, units Cu percent of total | Assay percent Zn | Percent weight × assay units Zn | Percent recovery, units Zn percent of total | Assay percent S | Percent weight × assay units S | Percent recovery, units S percent of total |
| Con A | 7.23 | 7.24 | 52.34 | 41.4 | 7.87 | 56.90 | 13.7 | 23.19 | 167.7 | 11.6 |
| Con B | 7.34 | 3.79 | 27.82 | 22.0 | 11.73 | 86.10 | 20.7 | 18.16 | 133.3 | 9.2 |
| Con C | 6.48 | 2.69 | 17.43 | 13.9 | 25.29 | 163.88 | 39.4 | 22.69 | 147.0 | 10.1 |
| Con D | 22.12 | 1.17 | 25.88 | 20.5 | 4.04 | 89.36 | 21.4 | 39.81 | 880.6 | 60.8 |
| Cumulative cons | 43.17 | -------- | 123.47 | 97.8 | -------- | 396.24 | 95.2 | -------- | 1328.6 | 91.7 |
| Tails | 56.83 | 0.05 | 2.85 | 2.2 | 0.35 | 19.89 | 4.8 | 2.12 | 120.5 | 8.3 |
| Calc. heads | 100 | 1.26 | 126.32 | 100 | 4.16 | 416.13 | 100 | 14.49 | 1449.1 | 100 |

TABLE III

| | Substituted aldehyde polymerized | Chemical name of polymer | Number of carbon atoms in Straight chain alkyl radical | Number of carbon atoms in Alkoxy substituent thereon | Structural formula of $R_1$, $R_2$, $R_3$ |
|---|---|---|---|---|---|
| M.P.A. polymer | Beta-methoxypropionaldehyde | 2.4.6-tris-(2' methoxyethyl)-1.3.5-trioxane. | 2 | 1 | $R_1$, $R_2$, $R_3$ are $CH_3O-CH_2-CH_2-$ |
| E.P.A. polymer | Beta-ethoxypropionaldehyde | 2.4.6-tris-(2' ethoxyethyl)-1.3.5-trioxane. | 2 | 2 | $R_1$, $R_2$, $R_3$ are $C_2H_5O-CH_2-CH_2-$ |
| P.P.A. polymer | Beta-n-propoxypropionaldehyde | 2.4.6-tris-(2' propoxyethyl)-1.3.5-trioxane. | 2 | 3 | $R_1$, $R_2$, $R_3$ are $C_3H_7O-CH_2-CH_2-$ |
| M.B.A. polymer | Beta-methoxybutyraldehyde | 2.4.6-tris-(2' methoxypropyl)-1.3.5-trioxane. | 3 | 1 | $R_1$, $R_2$, $R_3$ are $CH_3-CH-CH_2-$ <br>         | <br>        $OCH_3$ |
| M.(E) B.A. polymer | 2 moles beta-methoxy-butyraldehyde and 1 mole Beta-ethoxy-butyraldehyde. | 2.4-bis-(2' methoxypropyl)-6-(2' ethoxypropyl)-1.3.5-trioxane. | 3 | 1 and 2 | $R_1$, $R_3$ are $CH_3-CH-CH_2-$ <br>         | <br>        $OCH_3$ <br> $R_2$ is $CH_3-CH-CH_2-$ <br>         | <br>        $OC_2H_5$ |
| E.B.A. polymer | Beta-ethoxybutyraldehyde | 2.4.6-tris-(2' ethoxypropyl)-1.3.5-trioxane. | 3 | 2 | $R_1$, $R_2$, $R_3$ are $CH_3-CH-CH_2-$ <br>         | <br>        $OC_2H_5$ |
| P.B.A. polymer | Beta-n-propoxybutyraldehyde | 2.4.6-tris-(2' propoxypropyl)-1.3.5-trioxane. | 3 | 3 | $R_1$, $R_2$, $R_3$ are $CH_3-CH-CH_2$ <br>         | <br>        $OC_3H_7$ |
| M.A.A. polymer | Methoxyacetaldehyde | 2.4.6-tris-(methoxymethyl)-1.3.5-trioxane. | 1 | 1 | $R_1$, $R_2$, $R_3$ are $CH_3O-CH_2-$ |

TABLE IV

*Summarized Results*

PERCENT WEIGHTS

[Cum.=Cumulated]

| | Copper concentrate (concentrate A) | Copper-zinc middlings (concentrate B) | A+B cum. | Zinc concentrate (concentrate C) | A+B+C cum. | Pyrites concentrate (concentrate D) | A+B+C+D cum. |
|---|---|---|---|---|---|---|---|
| Control | 7.23 | 7.34 | 14.57 | 6.48 | 21.05 | 22.12 | 43.17 |
| With M.P.A. Polymer | 8.92 | 11.82 | 20.74 | 9.36 | 30.10 | 20.23 | 50.33 |
| With E.P.A. Polymer | 6.82 | 14.72 | 21.54 | 10.16 | 31.70 | 19.20 | 50.90 |
| With P.P.A. Polymer | 7.53 | 13.67 | 21.20 | 7.77 | 28.97 | 20.13 | 49.10 |
| With M.B.A. Polymer | 9.66 | 19.50 | 29.16 | 7.85 | 37.01 | 17.75 | 54.76 |
| With M.(E) B.A. Polymer | 7.50 | 18.50 | 26.00 | 7.40 | 33.40 | 18.73 | 52.13 |
| With B.B.A. Polymer | 10.00 | 17.06 | 27.06 | 8.04 | 35.10 | 18.24 | 53.34 |
| With P.B.A. Polymer | 7.02 | 14.24 | 21.26 | 9.07 | 30.33 | 21.23 | 51.56 |

PERCENT RECOVERIES—COPPER

| | Copper concentrate (concentrate A) | Copper-Zinc middlings (concentrate B) | A+B cum. | Zinc concentrate (concentrate C) | A+B+C cum. | Pyrites concentrate (concentrate D) | A+B+C+D cum. | Calc: Heads Cu, percent |
|---|---|---|---|---|---|---|---|---|
| Control | 41.4 | 22.0 | 63.4 | 13.9 | 77.3 | 20.5 | 97.8 | 1.26 |
| With M.P.A. Polymer | 55.4 | 22.1 | 77.5 | 12.6 | 90.1 | 8.8 | 98.9 | 1.29 |
| With E.P.A. Polymer | 36.8 | 29.5 | 66.3 | 20.0 | 86.3 | 11.3 | 97.6 | 1.18 |
| With P.P.A. Polymer | 45.0 | 26.9 | 71.9 | 14.5 | 86.4 | 13.1 | 99.5 | 1.21 |
| With M.B.A. Polymer | 58.7 | 23.6 | 82.3 | 9.4 | 91.7 | 6.9 | 98.6 | 1.17 |
| With M.(E)B.A. Polymer | 38.6 | 35.0 | 73.6 | 10.7 | 84.3 | 11.8 | 96.1 | 1.27 |
| With E.B.A. Polymer | 49.1 | 26.8 | 75.9 | 10.8 | 86.7 | 10.0 | 96.7 | 1.29 |
| With P.B.A. Polymer | 36.3 | 25.2 | 61.5 | 16.7 | 78.2 | 18.8 | 97.0 | 1.32 |

PERCENT RECOVERIES—ZINC

| | Copper concentrate (concentrate A) | Copper-Zinc middlings (concentrate B) | A+B cum. | Zinc concentrate (concentrate C) | A+B+C cum. | Pyrites concentrate (concentrate D) | A+B+C+D cum. | Calc: Heads Cu, percent |
|---|---|---|---|---|---|---|---|---|
| Control | 13.7 | 20.7 | 34.4 | 39.4 | 73.8 | 21.4 | 95.2 | 4.16 |
| With M.P.A. Polymer | 18.8 | 29.4 | 48.2 | 40.2 | 88.2 | 4.5 | 96.7 | 4.02 |
| With E.P.A. Polymer | 14.3 | 36.3 | 50.6 | 39.7 | 90.3 | 6.8 | 97.1 | 3.96 |
| With P.P.A. Polymer | 14.5 | 26.3 | 40.8 | 43.8 | 84.6 | 11.8 | 96.4 | 3.96 |
| With M.B.A. Polymer | 18.9 | 38.5 | 57.4 | 34.4 | 91.8 | 5.3 | 97.1 | 4.00 |
| With M.(E)B.A. Polymer | 14.1 | 34.1 | 48.2 | 39.7 | 87.9 | 8.1 | 96.0 | 3.87 |
| With E.B.A. Polymer | 18.7 | 34.6 | 53.3 | 36.2 | 89.5 | 6.8 | 96.3 | 3.81 |
| With P.B.A. Polymer | 14.3 | 24.0 | 38.3 | 45.0 | 83.3 | 12.7 | 96.0 | 4.10 |

PERCENT RECOVERIES—SULPHUR

| | Copper concentrate (concentrate A) | Copper Zinc middlings (concentrate B) | A+B cum. | Zinc concentrate (concentrate C) | A+B+C cum. | Pyrites concentrate (concentrate D) | A+B+C+D cum. | Calc: Heads Sulphur, percent |
|---|---|---|---|---|---|---|---|---|
| Control | 11.6 | 9.2 | 20.8 | 10.1 | 30.9 | 60.8 | 91.7 | 14.49 |
| With M.P.A. Polymer | 14.5 | 14.8 | 29.3 | 15.6 | 44.9 | 51.0 | 95.9 | 14.52 |
| With E.P.A. Polymer | 9.5 | 16.8 | 26.3 | 18.0 | 44.3 | 49.8 | 94.1 | 14.70 |
| With P.P.A. Polymer | 14.3 | 16.2 | 30.5 | 13.1 | 43.6 | 51.5 | 95.1 | 14.81 |
| With M.B.A. Polymer | 16.2 | 22.0 | 38.2 | 13.1 | 51.3 | 45.2 | 96.5 | 14.41 |
| With M.(E) B.A. Polymer | 11.5 | 22.1 | 33.6 | 11.6 | 45.2 | 50.3 | 95.5 | 14.61 |
| With E.B.A. Polymer | 16.2 | 20.3 | 36.5 | 12.3 | 48.8 | 46.5 | 95.3 | 14.50 |
| With P.B.A. Polymer | 10.2 | 16.2 | 26.4 | 16.1 | 42.5 | 52.4 | 94.9 | 14.09 |

These tabulated results will demonstrate clearly to a person-in-the-art the accelerating properties of these new chemical compounds on flotation processes. However, by way of example an analysis is given below of the effects of one of the polymers, namely, "M.B.A. Polymer" compared to the control without polymers.

Note, firstly, that for only 2.43% extra weight, 17.3% extra copper is recovered in the "copper pull" (Con. A), but only 5.2% extra zinc; in the "copper-zinc-middlings pull" (Con. B), a relatively large increase of 12.16% extra weight recovers only 1.6% extra copper, but 17.8% extra zinc; in the zinc-pull" (Con. C), a small increase of 1.37% extra weight recovers 4.5% less copper (because progressively 18.9% extra copper had already been recovered in Cons. A+B), and 5.0% less zinc (because progressively 23.0% extra zinc had already been recovered in Cons. A+B).

Looking at the other end of the series of operations, the final bulk concentrate of high-grade pyrites (Con. D), was 4.37% less in weight, but contained in it was 13.6% less of the copper, and 16.1% less of the zinc.

The overall loss of copper in the tailings was 0.8% less, and of zinc 1.9% less.

These results clearly demonstrate the characteristic effect of using these chemicals as additives, all other reagents and procedures being identical. This effect is a speeding-up or acceleration of flotation of the particular mineral for whose flotation conditions are correct.

Those skilled in the art will be able to devise plant procedures that make the best use of such effects to give improved metallurgical results.

EXAMPLE IV

As an illustration of the observed effects obtained by using the new chemical compounds of this invention as accelerators in flotation processes a report is set out in this example of a preliminary test using the M.B.A polymer in addition to normal promoter and frother on a gold bearing arsenopyrite ore-concentrating plant.

A feature of the plant was a unit cell included in the grinding circuit, and as it was felt that this would be an ideal place to observe the effects, the accelerator was added to the pump sump immediately before the unit cell.

It was observed that the froth texture and depth changed immediately, becoming much tougher, also showing signs of intense mineral flocculation. As the froth became tougher it appeared that considerable coarser material was being retained and in addition that more slimed graphite and arseno-pyrite was being lifted at this stage.

The rate of addition of accelerator was increased from about 0.1 lb. per ton ore to about double, and instead of "running" the froth became tougher still, the mineral building up to an extent that additional frother (T.E.B./Pine Oil) and promoter Aerofloat 25 had to be used to get the froth moving.

It appeared at this stage that the grade was down slightly but by the amount of material removed the recovery must have increased.

Once this section had settled down, a second reagent feeder was set up over the conditioner to the roughing bank and additional accelerator added at this point.

Similar effects were noticed—bubble texture changed to a smaller more persistent bubble, and the froth toughened up. The load consisted of some fairly coarse material and much slimed graphite and arseno-pyrite.

It was this slimed graphite and arseno-pyrite that gave the most interesting picture. The colour of the cells became much darker than before and the scavengers much lighter in colour, this latter being most unusual. In other words the more sluggish material was coming "up cell" and its rate of flotation increased i.e. "accelerated."

EXAMPLE V

This example will illustrate that although certain of the new compounds of this invention e.g. M.B.A. Polymer, which from Examples III and IV above is clearly an excellent accelerator, do act as very good frothers in water, nevertheless the accelerating properties of the new compounds of this invention are not necessarily dependent on their ability to form a froth in water.

The following tests were conducted in a Denver-Fahrenwald machine of 10 litre capacity.

30 drops (±0.27 ml.) of unreacted beta-methoxy-butyraldehyde were added to 10 litres of water, and upon aeration very little froth was formed.

However, in a comparative test the addition of as little as 2 to 4 drops (0.018 to 0.036 ml.) of the M.B.A. Polymer gave, upon aeration, copious volumes of froth of a desirable type. These tests demonstrated water frothing powers of these 2 materials.

A similar test with unreacted beta-ethoxybutyraldehyde required over 20 drops (0.18 ml.) to give, upon aeration, an appreciable volume of froth, whereas, as little as 4 drops (0.036 ml.) of the E.B.A. Polymer gave, upon aeration, copious volumes of froth of a desirable type.

The M.A.A. Polymer however is completely water soluble and has no visible effect on the water in the standard water frothing test. Nevertheless, when submitted to the ore tests according to Example III it clearly showed the accelerating effect as will be apparent from Table V below in which the results are set out in the same manner as in Table IV above.

EXAMPLE VII

*Reagent M.B.A. Polymer Versus Control With "37 X" (a Blend of Triethoxybutane and Triethoxyhexane) on Pyrites-Gold-Bearing Residues From Cyanidation. pH 5.8*

(Sodium sec.-butylxanthate used as promoter.)

A Denver-Fahrenwald machine of 10 litre capacity was used with an aqueous ore pulp in the manner known to persons skilled in the art.

0.040 lb./ton of residues of M.B.A. Polymer floated 6.80% weight of concentrates containing 86.9% of the pyrites, and 50.0% of the gold.

0.040 lb./ton of residues of "37 X", floated 5.94% weight of concentrates containing 86.6% of the pyrites, and

TABLE V

PERCENT WEIGHTS

|  | Con A | Con B | A+B cum. | Con C | A+B+C cum. | Con D | A+B+C+D cum. |
|---|---|---|---|---|---|---|---|
| Control | 3.3 | 3.4 | 6.7 | 4.1 | 10.8 | 23.6 | 34.4 |
| With M.A.A. Polymer | 4.8 | 5.1 | 9.9 | 6.8 | 16.7 | 25.2 | 41.9 |

PERCENT RECOVERIES COPPER

|  | Con A | Con B | A+B cum. | Con C | A+B+C cum. | Con D | A+B+C+D cum. | Calc: Heads Cu, percent |
|---|---|---|---|---|---|---|---|---|
| Control | 29.2 | 21.1 | 50.3 | 11.7 | 62.0 | 36.0 | 98.0 | 1.25 |
| With M.A.A. Polymer | 36.0 | 20.3 | 56.3 | 12.0 | 68.3 | 28.1 | 96.4 | 1.37 |

PERCENT RECOVERIES ZINC

|  | Con A | Con B | A+B cum. | Con C | A+B+C cum. | Con D | A+B+C+D cum. | Calc: Heads Zn, percent |
|---|---|---|---|---|---|---|---|---|
| Control | 8.2 | 9.7 | 17.9 | 32.4 | 50.3 | 43.8 | 94.1 | 3.98 |
| With M.A.A. Polymer | 11.2 | 13.6 | 24.8 | 47.0 | 71.8 | 24.6 | 96.4 | 3.98 |

PERCENT RECOVERIES SULPHUR

|  | Con A | Con B | A+B cum. | Con C | A+B+C cum. | Con D | A+B+C+D cum. | Calc: Heads S, percent |
|---|---|---|---|---|---|---|---|---|
| Control | 5.6 | 5.8 | 11.4 | 7.5 | 18.9 | 66.9 | 85.8 | 14.60 |
| With M.A.A. Polymer | 8.9 | 8.5 | 17.4 | 11.4 | 28.8 | 66.3 | 95.1 | 14.62 |

EXAMPLE VI

*Reagents E.B.A. Polymer and M.B.A. Polymer Versus Control With T.E.B./Pine Oil on a Barberton Pyrite Ore. pH 8.0*

A Denver-Fahrenwald machine of 10 litre capacity was used with an aqueous ore pulp in the manner known to persons skilled in the art.

"Starvation" quantities used, 0.018 lb./ton of ore, to pull a concentrate for 5 minutes. Sodium sec.-butylxanthate used as a promotor.

M.B.A. Polymer—74.7% of pyrites floated @ grade 30.46% S.
E.B.A. Polymer—80.6% of pyrites floated @ grade 32.96% S.
"Control"—64.9% of pyrites floated @ grade 36.35% S.

Far the best depth of froth was given by M.B.A. Polymer. In the case of E.B.A. Polymer and M.B.A. Polymer mineral-collecting power was evident, as well as powerful frothing effects 48.0% of the gold. In this test the frothing power of M.B.A. Polymer was predominant.

EXAMPLE VIII

*Reagents M.B.A. Polymer and E.B.A. Polymer Plus T.E.B./Pine Oil Versus Control With T.E.B./Pine Oil Alone, on a Transvaal Ore Containing Arseno-Pyrite and Gold (0.9% As :12 Dwts. Au). pH 7.2*

A Denver-Fahrenwald machine of 10 litre capacity was used with an aqueous ore pulp in the manner known to persons skilled in the art.

In these tests neither M.B.A. Polymer nor E.B.A. Polymer had any true frothing properties: froths had to be produced by means of the T.E.B./Pine Oil mixture whether or not the M.B.A. Polymer or E.B.A. Polymer was added.

In each test 0.3 lb./ton of sec.-butylxanthate was added at the start, plus the requisite number of drops of T.E.B.% Pine Oil frother.

After pulling the first concentrate for 2 minutes, another 0.1 lb./ton of xanthate, and the appropriate quantity of T.E.B./Pine Oil was added; a second concentrate was pulled for 2 minutes.

Then another 0.1 lb. of xanthate, and the appropriate quantity of T.E.B./Pine Oil was added, and a final concentrate pulled for 3 minutes.

PERCENTAGE RECOVERIES

Control 56.8% of the As and 65.9% of the Au in first concentrate.
63.2% of the As and 70.4% of the Au in first and second concentrates.
84.9% of the As and 91.5% of the Au in total concentrates.

M.B.A. polymer 0.048 lbs./ton ore additionally 85.9% of the As and 89.0% of the Au in first concentrate.
90.0% of the As and 92.4% of the Au in first and second concentrates.
91.6% of the As and 93.8% of the Au in total concentrates.

E.B.A. polymer 0.048 lbs./ton ore additionally 77.4% of the As and 83.1% of the Au in first concentrate.
85.1% of the As and 90.8% of the Au in first and second concentrates.
87.5% of the As and 93.0% of the Au in total concentrates.

We claim:

1. Chemical compounds having the formula:

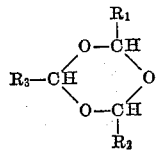

wherein each of $R_1$, $R_2$ and $R_3$ is alkoxy alkylene, the alkylene moiety being straight chain and each of the alkoxy and alkylene moieties having from 1 to 3 carbon atoms.

2. 2.4.6-tris-(2' methoxypropyl)-1.3.5-trioxane.
3. 2.4.6-tris-(2' ethoxypropyl)-1.3.5-trioxane.
4. 2.4.6-tris-(2' propoxypropyl)-1.3.5-trioxane.
5. 2.4.6-tris-(2' methoxyethyl)-1.3.5-trioxane.
6. 2.4-bis-(2' methoxypropyl)-6-(2'ethoxypropyl)-1.3.5-trioxane.
7. 2.4.6-tris-(methoxymethyl)-1.3.5-trioxane.
8. 2.4.6-tris-(ethoxymethyl)-1.3.5-trioxane.

9. A process for preparing compounds of the formula:

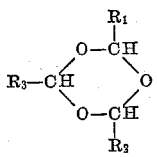

wherein $R_1$, $R_2$ and $R_3$ are straight chain alkyl radicals of 1 to 3 carbon atoms with an alkoxy substituent thereon which substituent also has 1 to 3 carbon atoms, which comprises polymerising, in the presence of catalytic quantities of a halogen, at least one substituted aldehyde having 2 to 4 carbon atoms and each containing as a substituent an alkoxy group having 1 to 3 carbon atoms.

10. A process according to claim 9 wherein iodine is used as the catalyst.

11. A process of preparing 2.4.6-tris-(2' methoxypropyl)-1.3.5-trioxane by polymerising beta-methoxybutyraldehyde in the presence of catalytic quantities of iodine.

12. A process of preparing 2.4.6-tris-(2' ethoxypropyl)-1.3.5-trioxane by polymerising beta-ethoxybutyraldehyde in the presence of catalytic quantities of iodine.

13. A process of preparing 2.4.6-tris-(2' propoxypropyl)-1.3.5-trioxane by polymerising beta-n-propoxybutyraldehyde in the presence of catalytic quantities of iodine.

14. A process of preparing 2.4.6-tris-(2' methoxyethyl)-1.3.5-trioxane by polymerising beta-methoxypropionaldehyde in the presence of catalytic quantities of iodine.

15. A process of preparing 2.4.6-tris-(methoxymethyl)-1.3.5-trioxane by polymerising methoxyacetaldehyde in the presence of catalytic quantities of iodine.

16. A process of preparing 2.4.6-tris-(ethoxymethyl)-1.3.5-trioxane by polymerising ethoxyacetaldehyde in the presence of catalytic quantities of iodine.

17. A process of preparing 2.4-bis-(2' methoxypropyl)-6-(2' ethoxypropyl)-1.3.5-trioxane by copolymerising 2 moles of beta-methoxybutyraldehyde and 1 mole of beta-ethoxybutyraldehyde in the presence of catalytic quantities of iodine.

No references cited.